United States Patent
Yamazaki (10) Patent No.: US 9,296,384 B2
(45) Date of Patent: Mar. 29, 2016

(54) VEHICLE AND VEHICLE CONTROL METHOD

(75) Inventor: Makoto Yamazaki, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 294 days.

(21) Appl. No.: 13/404,830

(22) Filed: Feb. 24, 2012

(65) Prior Publication Data

US 2012/0221185 A1 Aug. 30, 2012

(30) Foreign Application Priority Data

Feb. 25, 2011 (JP) ................................. 2011-039931

(51) Int. Cl.
| | |
|---|---|
| B60W 20/00 | (2006.01) |
| B60K 6/445 | (2007.10) |
| B60W 10/06 | (2006.01) |
| F02P 5/15 | (2006.01) |
| B60W 30/192 | (2012.01) |
| F02N 11/04 | (2006.01) |

(52) U.S. Cl.
CPC .............. *B60W 20/00* (2013.01); *B60K 6/445* (2013.01); *B60W 10/06* (2013.01); *F02P 5/1506* (2013.01); *B60W 20/20* (2013.01); *B60W 30/192* (2013.01); *B60W 2510/0628* (2013.01); *B60W 2510/0676* (2013.01); *B60W 2510/244* (2013.01); *B60W 2520/10* (2013.01); *B60W 2550/12* (2013.01); *F02D 2200/021* (2013.01); *F02N 11/04* (2013.01); *F02N 2200/101* (2013.01); *Y02T 10/46* (2013.01); *Y02T 10/6239* (2013.01)

(58) Field of Classification Search
CPC .............. B60W 10/06; B60W 20/108; B60W 20/1082; B60W 20/00; B60K 6/445

USPC ............................................. 701/22; 903/902
See application file for complete search history.

(56) References Cited

U.S. PATENT DOCUMENTS

| | | | |
|---|---|---|---|
| 6,505,594 B1 | 1/2003 | Katayama et al. | |
| 6,776,739 B2 * | 8/2004 | Eguchi et al. | 477/107 |
| 7,395,659 B2 * | 7/2008 | Pott | 60/285 |
| 8,353,265 B2 * | 1/2013 | Pursifull | 123/142.5 R |
| 8,914,178 B2 * | 12/2014 | Yamazaki | 701/22 |
| 2003/0073540 A1 * | 4/2003 | Eguchi et al. | 477/110 |
| 2004/0231627 A1 | 11/2004 | Kaita et al. | |
| 2004/0237510 A1 * | 12/2004 | Kusada et al. | 60/285 |
| 2005/0034451 A1 * | 2/2005 | Miyashita | 60/300 |

(Continued)

FOREIGN PATENT DOCUMENTS

| | | |
|---|---|---|
| CN | 101680414 A | 3/2010 |
| JP | 2001-090581 A | 4/2001 |

(Continued)

*Primary Examiner* — John Q Nguyen
*Assistant Examiner* — Michael Whalen
(74) *Attorney, Agent, or Firm* — Kenyon & Kenyon LLP (57) ABSTRACT

A vehicle includes an internal combustion engine, a rotary electric machine that generates driving force for the vehicle, and a control unit that controls the internal combustion engine on the basis of a state of the vehicle. When the internal combustion engine is started in response to a request for the driving force, the control unit controls the internal combustion engine such that ignition timing of the internal combustion engine while a first mode is selected is later than the ignition timing while a second mode is selected. The vehicle is more likely to be driven using the rotary electric machine in a state where the internal combustion engine is stopped in the first mode than in the second mode.

17 Claims, 5 Drawing Sheets

(56) References Cited

U.S. PATENT DOCUMENTS

| | | | |
|---|---|---|---|
| 2006/0156710 A1* | 7/2006 | Pott | 60/285 |
| 2007/0205028 A1* | 9/2007 | Leone et al. | 180/65.2 |
| 2010/0044131 A1* | 2/2010 | Teraya | 180/65.265 |
| 2010/0065376 A1* | 3/2010 | Pursifull | 184/6.22 |
| 2010/0229829 A1 | 9/2010 | Miyazaki et al. | |
| 2011/0276211 A1* | 11/2011 | Teraya | 701/22 |
| 2012/0310458 A1* | 12/2012 | Nawata et al. | 701/22 |
| 2013/0204478 A1* | 8/2013 | Watanabe et al. | 701/22 |
| 2013/0261859 A1* | 10/2013 | Sugimoto | 701/22 |
| 2014/0005872 A1* | 1/2014 | Teraya | 701/22 |

FOREIGN PATENT DOCUMENTS

| | | |
|---|---|---|
| JP | 2004-346811 A | 12/2004 |
| JP | 2007-182179 A | 7/2007 |

* cited by examiner

|  | INITIAL START | | INTERMITTENT START |
|---|---|---|---|
|  | EV PRIORITY MODE | HV PRIORITY MODE |  |
| AUTONOMOUS START | MAP A | MAP B | MAP C |
| LOAD REQUEST START | MAP D | MAP E | MAP F |

VEHICLE AND VEHICLE CONTROL METHOD

INCORPORATION BY REFERENCE

The disclosure of Japanese Patent Application No. 2011-039931 filed on Feb. 25, 2011 including the specification, drawings and abstract is incorporated herein by reference in its entirety.

BACKGROUND OF THE INVENTION

1. Field of the Invention

The invention relates to control for starting an internal combustion engine that is mounted on a hybrid vehicle.

2. Description of Related Art

In a hybrid vehicle equipped with a rotary electric machine and an internal combustion engine, the internal combustion engine may be started while the vehicle is running. For example, Japanese Patent Application Publication No. 2007-182179 (JP-A-2007-182179) describes a technique for, when an internal combustion engine is started while a hybrid vehicle is running, retarding the ignition timing at the time of starting the internal combustion engine as the vehicle speed decreases.

Incidentally, a hybrid vehicle carries out any one of control for driving the vehicle using a rotary electric machine and control for driving the vehicle using both the rotary electric machine and an internal combustion engine. It is necessary to determine the appropriate ignition timing at the time of starting the internal combustion engine depending on which one of these controls is given priority. This is because the state of the internal combustion engine at the time of starting the internal combustion engine may vary depending on which control is carried out in preference. In a vehicle control device described in the above JP-A-2007-182179, such a problem is not considered, so there is room for improvement in determining the ignition timing.

SUMMARY OF THE INVENTION

The invention provides a vehicle and vehicle control method that determine the appropriate ignition timing at the time of starting an internal combustion engine mounted on a hybrid vehicle.

An aspect of the invention relates to a vehicle. The vehicle includes: an internal combustion engine; a rotary electric machine that generates driving force for the vehicle; and a control unit that controls the internal combustion engine on the basis of a state of the vehicle. When the internal combustion engine is started in response to a request for the driving force, the control unit controls the internal combustion engine such that ignition timing of the internal combustion engine while a first mode is selected is later than the ignition timing while a second mode is selected. The vehicle is more likely to be driven using the rotary electric machine in a state where the internal combustion engine is stopped in the first mode than in the second mode.

Another aspect of the invention relates to a vehicle control method used in a vehicle equipped with an internal combustion engine, a rotary electric machine that generates driving force for the vehicle and an electrical storage device that supplies electric power to the rotary electric machine. The vehicle control method includes: detecting a request for the driving force; and controlling the internal combustion engine such that, when the internal combustion engine is started in response to a request for the driving force, ignition timing of the internal combustion engine while a first mode is selected is later than the ignition timing while a second mode is selected. The vehicle is more likely to be driven using the rotary electric machine in a state where the internal combustion engine is stopped in the first mode than in the second mode.

For example, in a vehicle that is chargeable using an external power supply, when the vehicle is charged using the external power supply and then the first mode is selected at the time when the vehicle is started to move, it is necessary to generate output power immediately after the start of the internal combustion engine. Therefore, when the internal combustion engine is started in response to a request for driving force, the internal combustion engine is controlled such that the ignition timing at the time of starting the internal combustion engine while the first mode is selected is later than that in the second mode to thereby make it possible to improve startability of the internal combustion engine while the first mode is selected and improve emissions of exhaust gas. Thus, it is possible to provide the vehicle and vehicle control method that determine the appropriate ignition timing at the time of starting the internal combustion engine equipped for the hybrid vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the following description, like reference numerals denote the same components. The names and functions of them are also the same. Thus, the detailed description of them will not be repeated.

The overall block diagram of a vehicle 1 according to the present embodiment will be described with reference to FIG. 1. The vehicle 1 includes an engine 10, a first motor generator (hereinafter, referred to as first MG) 20, a second motor generator (hereinafter, referred to as second MG) 30, a power control unit (PCU) 60, a main battery 70, a charging device 78, drive wheels 80, a transmission 86 and an electronic control unit (ECU) 200. The transmission 86 includes a driving shaft 16, a power split device 40, a reduction gear 58 and a drive shaft 82.

The vehicle 1 runs with driving force output from at least one of the engine 10 and the second MG 30. Power generated by the engine 10 is divided and distributed to two paths by the power split device 40. One of the two paths is routed to the drive wheels 80 via the reduction gear 58, and the other one of the two paths is routed to the first MG 20.

The first MG 20 and the second MG 30 each are, for example, a three-phase alternating current rotary electric machine. The first MG 20 and the second MG 30 are driven by the PCU 60.

The first MG 20 functions as a generator that uses the power of the engine 10, split by the power split device 40, to generate electric power and that charges the main battery 70 via the PCU 60. In addition, the first MG 20 receives electric power from the main battery 70 to rotate a crankshaft that is the output shaft of the engine 10. By so doing, the first MG 20 functions as a starter that starts the engine 10.

The second MG 30 functions as a drive motor that uses at least any one of electric power stored in the main battery 70 and electric power generated by the first MG 20 to give driving force to the drive wheels 80. In addition, the second MG 30 functions as a generator that uses electric power, generated by regenerative braking, to charge the main battery 70 via the PCU 60.

The engine 10 is, for example, an internal combustion engine, such as a gasoline engine and a diesel engine. The engine 10 includes a plurality of cylinders 102, an ignition device 104 and an intake passage 112. The ignition device 104 includes a plurality of ignition plugs that are respectively provided in the cylinders 102. The ignition device 104 sparks the ignition plug of each cylinder at the appropriate ignition timing on the basis of a control signal S1 from the ECU 200. Furthermore, the engine 10 is provided with an engine rotation speed sensor 11. The engine rotation speed sensor 11 is used to detect the rotation speed Ne of the crankshaft of the engine 10 (hereinafter, referred to as engine rotation speed). The engine rotation speed sensor 11 transmits a signal that indicates the detected engine rotation speed Ne to the ECU 200.

The power split device 40 mechanically couples three elements, that is, the driving shaft 16 for rotating the drive wheels 80, the output shaft of the engine 10 and the rotary shaft of the first MG 20. The power split device 40 sets any one of the above described three elements as a reaction element to enable transmission of power between the other two elements. The rotary shaft of the second MG 30 is coupled to the driving shaft 16.

The power split device 40 is a planetary gear mechanism that includes a sun gear, pinion gears, a carrier and a ring gear. The pinion gears are in mesh with the sun gear and the ring gear. The carrier rotatably supports the pinion gears, and is coupled to the crankshaft of the engine 10. The sun gear is coupled to the rotary shaft of the first MG 20. The ring gear is coupled to the rotary shaft of the second MG 30 and the reduction gear 58 via the driving shaft 16.

The reduction gear 58 transmits power from the power split device 40 or the second MG 30 to the drive wheels 80. In addition, the reduction gear 58 transmits reaction force from a road surface, received by the drive wheels 80, to the power split device 40 or the second MG 30.

The PCU 60 converts direct-current electric power stored in the main battery 70 to alternating-current electric power for driving the first MG 20 and the second MG 30. The PCU 60 includes a step-up converter 62 and an inverter 64 that are controlled on the basis of a control signal S2 from the ECU 200.

The step-up converter 62 steps up the voltage of direct-current electric power received from the main battery 70 and then outputs the voltage to the inverter 64. The inverter 64 converts direct-current electric power output from the step-up converter 62 to alternating-current electric power and then outputs the alternating-current electric power to the first MG 20 and/or the second MG 30. By so doing, electric power stored in the main battery 70 is used to drive the first MG 20 and/or the second MG 30. In addition, the inverter 64 converts alternating-current electric power generated by the first MG 20 and/or the second MG 30 to direct-current electric power and then outputs the direct-current electric power to the step-up converter 62. The step-up converter 62 steps down the voltage of direct-current electric power output from the inverter 64 and then outputs the voltage to the main battery 70. By so doing, the main battery 70 is charged with electric power generated by the first MG 20 and/or the second MG 30. Note that the step-up converter 62 may be omitted.

The main battery 70 is an electrical storage device, and is a rechargeable direct-current power supply. The main battery 70 is connected to the PCU 60. For example, a secondary battery, such as a nickel metal hydride battery and a lithium ion battery, is used as the main battery 70. The voltage of the main battery 70 is, for example, about 200 V. The main battery 70 is charged with electric power generated by the first MG 20 and/or the second MG 30 as described above. Note that the main battery 70 is not limited to a secondary battery but it may be, for example, a component that is able to produce direct-current voltage, such as a capacitor, a photovoltaic cell and a fuel cell.

The main battery 70 is provided with a battery temperature sensor 156, a current sensor 158 and a voltage sensor 160. The battery temperature sensor 156 is used to detect the battery temperature TB of the main battery 70. The current sensor 158 is used to detect the current IB of the main battery 70. The voltage sensor 160 is used to detect the voltage VB of the main battery 70.

The battery temperature sensor 156 transmits a signal that indicates the battery temperature TB to the ECU 200. The current sensor 158 transmits a signal that indicates the current IB to the ECU 200. The voltage sensor 160 transmits a signal that indicates the voltage VB to the ECU 200.

An accelerator position sensor 162 detects the operation amount AP of an accelerator pedal (not shown). The accelerator position sensor 162 transmits a signal that indicates the operation amount AP of the accelerator pedal to the ECU 200.

A first resolver 12 detects the rotation speed Nm1 of the first MG 20. The first resolver 12 transmits a signal that indicates the detected rotation speed Nm1 to the ECU 200. A second resolver 13 detects the rotation speed Nm2 of the second MG 30. The second resolver 13 transmits a signal that indicates the detected rotation speed Nm2 to the ECU 200.

A wheel speed sensor 14 detects the rotation speed Nw of the corresponding drive wheel 80. The wheel speed sensor 14 transmits a signal that indicates the detected rotation speed Nw to the ECU 200. The ECU 200 calculates a vehicle speed V on the basis of the received rotation speed Nw. Note that the ECU 200 may be configured to calculate a vehicle speed V on the basis of the rotation speed Nm2 of the second MG 30 instead of the rotation speed Nw.

A coolant temperature sensor 106 detects the temperature Tw of coolant that flows inside the engine 10 (hereinafter, referred to as coolant temperature Tw). The coolant temperature sensor 106 transmits a signal that indicates the detected coolant temperature Tw to the ECU 200.

An intake air temperature sensor 110 detects the temperature Ti of air that flows through the intake passage 112 of the engine 10 (hereinafter, referred to as intake air temperature Ti). The intake air temperature sensor 110 transmits a signal that indicates the detected intake air temperature Ti to the ECU 200.

The charging device 78 charges the main battery 70 with electric power supplied from an external power supply 302 when a charging plug 300 is connected to a socket 84 of the vehicle 1. The charging plug 300 is connected to one end of a charging cable 304. The other end of the charging cable 304 is connected to the external power supply 302. The positive electrode terminal of the charging device 78 is connected to the positive electrode terminal of the main battery 70. The negative electrode terminal of the charging device 78 is connected to the negative electrode terminal of the main battery 70. Note that the external power supply 302 is, for example, a commercial power supply.

The ECU 200 generates the control signal S1 for controlling the engine 10, and outputs the generated control signal S1 to the engine 10. In addition, the ECU 200 generates the control signal S2 for controlling the PCU 60, and outputs the generated control signal S2 to the PCU 60.

The ECU 200 controls an overall hybrid system, that is, the charge and discharge states of the main battery 70 and the operating states of the engine 10, first MG 20 and second MG 30, such that the vehicle 1 most efficiently operates by controlling the engine 10, the PCU 60, and the like.

The ECU 200 calculates a required driving force corresponding to the operation amount AP of the accelerator pedal. The ECU 200 controls the torque of the first MG 20, the torque of the second MG 30 and the output power of the engine 10 on the basis of the calculated required driving force.

The thus configured vehicle 1 runs only using the second MG 30 in a state where the engine 10 is stopped in the case where the vehicle 1 starts moving, the vehicle runs at a low speed, for example, and the efficiency of the engine 10 is poor. In addition, during normal running, for example, the power of the engine 10 is divided by the power split device 40 into two-line powers. The drive wheels 80 are directly driven by one of the powers. The first MG 20 is driven by the other one of the powers to generate electric power. At this time, the ECU 200 uses the generated electric power to drive the second MG 30. The second MG 30 is driven in this way to assist in driving the drive wheels 80.

When the vehicle 1 decelerates, the second MG 30 is driven by the rotation of the drive wheels 80 to function as a generator to thereby carry out regenerative braking. Electric power recovered through regenerative braking is stored in the main battery 70. Note that, when the remaining amount (in the following description, referred to as state of charge (SOC)) of the electrical storage device decreases and the electrical storage device particularly needs to be charged, the ECU 200 increases the output power of the engine 10 to increase the amount of electric power generated by the first MG 20. By so doing, the SOC of the main battery 70 is increased. In addition, the ECU 200 sometimes executes control for increasing driving force from the engine 10 where necessary even during low-speed running. This is, for example, a case where the main battery 70 needs to be charged as described above, a case where an auxiliary, such as an air conditioner, is driven, a case where the temperature of coolant of the engine 10 is raised to a predetermined temperature, or the like.

In addition, in the vehicle 1, any one of an EV priority mode and an HV priority mode is selected. In each of the EV priority mode and the HV priority mode, both first control for driving the vehicle 1 using the second MG 30 in a state where the engine 10 is stopped and second control for driving the vehicle 1 using the engine 10 and the second MG 30 may be executed.

The vehicle 1 is more likely to be driven using the second MG 30 in a state where the engine 10 is stopped in the EV priority mode than in the HV priority mode.

For example, the vehicle 1 is controlled such that at least any one of the frequency, time and percentage at which first control is executed while the EV priority mode is selected is higher than that while the HV priority mode is selected.

For example, the EV priority mode may be selected at the time of a start-up of the system of the vehicle 1 immediately after the main battery 70 is charged using the external power supply 302. Alternatively, the EV priority mode may be selected in response to a driver's switch operation.

When the EV priority mode is selected, the ECU 200 executes first control when first control is allowed to be executed, and executes second control when first control is not allowed to be executed.

Specifically, while the EV priority mode is selected, the ECU 200 executes first control when the SOC of the main battery 70 is higher than or equal to a threshold SOC(0), and drives the vehicle 1 using the second MG 30 in a state where the engine 10 is stopped.

In addition, even while the EV priority mode is selected, the ECU 200 starts the engine 10 in order to execute second control when the SOC of the main battery 70 is lower than the threshold or when a driving force that exceeds the upper limit of the output power of the second MG 30 is required. The threshold SOC(0) is the lower limit of the range of the SOC in which EV driving is allowed. In EV driving, the vehicle 1 is driven using the second MG 30 in a state where the engine 10 is stopped.

The vehicle 1 is more likely to be driven using both the engine 10 and the second MG 30 in the HV priority mode than in the EV priority mode. For example, the vehicle 1 is controlled such that at least any one of the frequency, time and percentage at which second control is executed while the HV priority mode is selected is higher than that while the EV priority mode is selected.

For example, it is applicable that, when the engine 10 is started because of a decrease in the SOC of the main battery 70 while the EV priority mode is selected, the mode automatically shifts from the EV priority mode to the HV priority mode after the engine 10 is started. Alternatively, the HV priority mode may be selected in response to a driver's switch operation.

While the HV priority mode is selected, the ECU 200 executes second control when second control is allowed to be executed, and executes first control when second control is not allowed to be executed.

Specifically, while the HV priority mode is selected, the ECU 200 executes second control when the SOC of the main battery 70 is lower than or equal to a threshold SOC(2) (>SOC(0)), and executes first control when the SOC of the main battery 70 is higher than the threshold SOC(2). The threshold SOC(2) is the upper limit of the SOC of the main battery 70, and, for example, corresponds to the case where the main battery 70 is in a full-charge state.

In the thus configured vehicle 1, it is necessary to appropriately set the ignition timing at the time of starting the engine 10 on the basis of which one of the EV priority mode and the HV priority mode is selected. This is because there is a case where the state at the time of starting the engine 10 varies depending on the selected mode. Particularly, when the external power supply 302 is used to charge the main battery 70 and the vehicle 1 runs after charging while the EV priority mode is selected, the engine 10 may be started in a state colder than that while the HV priority mode is selected. In addition, when driving force required of the vehicle 1 is large even while the EV priority mode is selected, the output power of the engine 10 is increased immediately after starting the engine 10 in order to generate the required driving force. Therefore, when the engine 10 is started in response to the required driving force of the vehicle 1 while the EV priority mode is selected, startability of the engine 10 or emissions of exhaust gas may deteriorate as compared with when the engine 10 is started while the HV priority mode is selected.

Then, in the present embodiment, when the ECU 200 starts the engine 10 in response to a required driving force, the ECU 200 controls the engine 10 such that the ignition timing of the engine 10 while the EV priority mode is selected is later than the ignition timing while the HV priority mode is selected.

Figure 2:
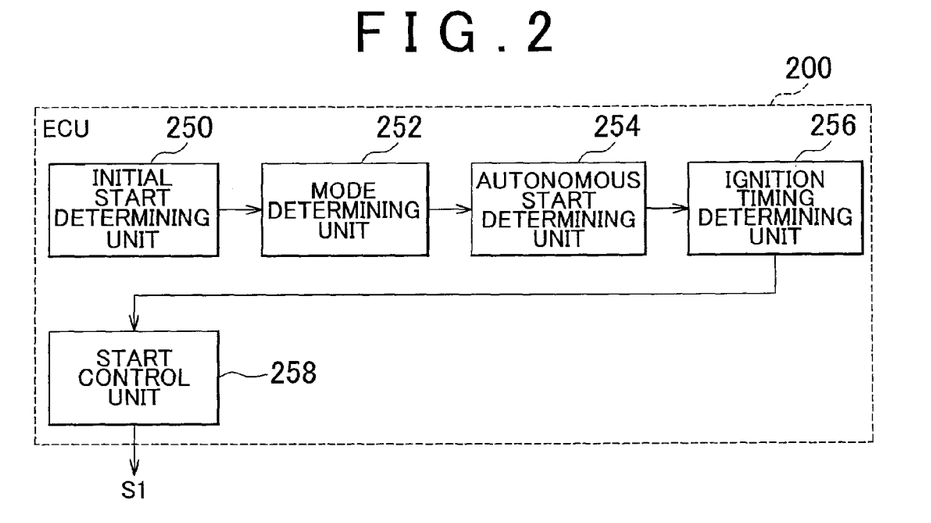
FIG. 2 is a functional block diagram of an ECU equipped for the vehicle according to the embodiment.

FIG. 2 shows a functional block diagram of the ECU 200 equipped for the vehicle 1 according to the present embodiment. The ECU 200 includes an initial start determining unit 250, a mode determining unit 252, an autonomous start determining unit 254, an ignition timing determining unit 256 and a start control unit 258.

The initial start determining unit 250 determines whether an initial start of the engine 10 is carried out. Note that the initial start of the engine 10 is a start of the engine 10 for the first time after a start switch is operated by the driver to start up the system of the vehicle 1.

For example, the initial start determining unit 250 determines that the initial start of the engine 10 is carried out when the engine 10 is started for the first time. The case where the engine 10 is started includes the case where the engine 10 is started in response to a request for load (load request start) and the case where the engine 10 is started autonomously (autonomous start).

The start of the engine 10 in response to a request for load is a start of the engine 10 in response to a request for diving force, and means the case where the engine 10 is started while the opening degree of a throttle valve is being varied. The load request start, for example, includes a start of the engine in the case where the output power of the second MG 30 is insufficient for the driving force required of the vehicle 1 (that is, the case where the output power of the engine 10 is required in order to suffice a required driving force).

The initial start determining unit 250, for example, determines that the engine 10 is started in response to a request for load when the operation amount AP of the accelerator pedal is larger than or equal to a threshold AP(0). Alternatively, the initial start determining unit 250, for example, determines that the engine 10 is started in response to a request for load when the variation ΔAP in the operation amount AP of the accelerator pedal is larger than or equal to a threshold ΔAP(0).

Note that the threshold AP(0) and the threshold ΔAP(0) are used to determine whether the output power of the engine 10 is required in order to suffice a required driving force. The threshold AP(0) or the threshold ΔAP(0) may be a value that varies with the state of the vehicle (for example, the SOC of the main battery 70, vehicle speed V, or the like) or may be a set value.

In addition, the initial start determining unit 250 may determine that the engine 10 is started in response to a request for load when the throttle opening degree is higher than or equal to a threshold or may determine that the engine 10 is started in response to a request for load when the variation in throttle opening degree is larger than or equal to a threshold.

The autonomous start is a start of the engine in response to a request other than a request for driving force. The autonomous start includes the case where the engine 10 is started without varying the opening degree of the throttle valve of the engine 10.

Specifically, the initial start determining unit 250 determines that the engine 10 is started autonomously when the SOC of the main battery 70 is lower than the threshold SOC (0) or when the vehicle speed V is higher than or equal to a threshold V(0). Note that the threshold V(0) is the lower limit of the vehicle speed V at or above which the first MG 20 excessively rotates if the rotation of the engine 10 is stopped while the vehicle 1 is running.

In addition, the initial start determining unit 250 determines whether the start of the engine 10 is an initial start on the basis of the status of a start flag. The start flag is set to an on status with an initial start of the engine 10, and is set to an off status with a stop of the system of the vehicle 1. Note that the initial start determining unit 250 may be, for example, configured to set an initial start determination flag when the initial start determining unit 250 determines that an initial start of the engine 10 is carried out.

The mode determining unit 252 determines which one of the EV priority mode and the HV priority mode is selected. The mode determining unit 252 may, for example, determine whether the EV priority mode is selected and, when it is determined that the EV priority mode is not selected, may determine that the HV priority mode is selected.

The mode determining unit 252 may, for example, determine that the EV priority mode is selected when the EV priority mode select flag is in an on status and, when the select flag is in an off status, may determine that the HV priority mode is selected.

The EV priority mode select flag may be, for example, set to an on status when the driver turns on a switch for selecting the EV priority mode or when the external power supply 302 is used to charge the main battery 70 and then the system of the vehicle 1 is started up for the first time.

In addition, the EV priority mode select flag may be, for example, set to an off status when the driver turns on a switch for selecting the HV priority mode, when the driver turns off the switch for selecting the EV priority mode or when the engine 10 is started because of a decrease in the SOC of the main battery 70 below the threshold SOC(0) while the EV priority mode is selected.

The autonomous start determining unit 254 determines whether the start of the engine 10 is an autonomous start or a load request start. The autonomous start determining unit 254 may determine whether the start of the engine 10 is an autonomous start as described above and then, when it is determined that the start of the engine 10 is not an autonomous start, may determine that the start of the engine 10 is a load request start as described above.

Note that the autonomous start determining unit 254 may, for example, set an autonomous start determination flag to an on status when the start of the engine 10 is an autonomous start, and may set the autonomous start determination flag to an off status when the start of the engine 10 is a load request start.

Figure 3:
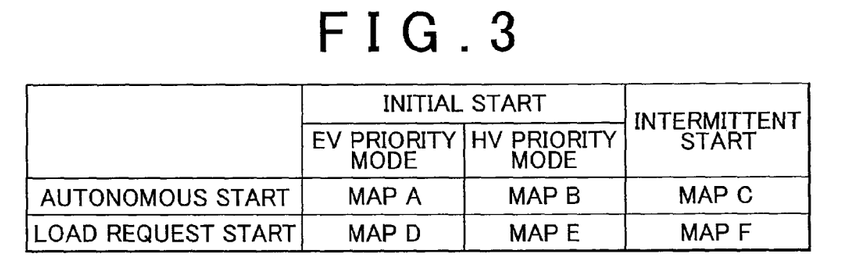
FIG. 3 is a table that shows the correlation between a condition in which an engine is started and a map to be selected.

The ignition timing determining unit 256 determines the initial ignition timing at the time of starting the engine 10 on the basis of the results determined by the initial start determining unit 250, the mode determining unit 252 and the autonomous start determining unit 254. The ignition timing determining unit 256, for example, selects a map corresponding to the determined results that indicate the starting condition of the engine as shown in FIG. 3. In addition, the ignition timing determining unit 256 determines the initial ignition timing at the time of starting the engine 10 on the basis of the selected map and the coolant temperature Tw of the engine 10.

Note that, in the present embodiment, the ignition timing determining unit 256 determines the initial ignition timing at the time of starting the engine 10 on the basis of the selected map and the coolant temperature Tw of the engine 10. Instead, for example, the map may be a two-dimensional map that shows the correlation between an intake air temperature Ti and an initial ignition timing and the initial ignition timing at the time of starting the engine 10 may be determined on the basis of the selected map and the intake air temperature Ti.

Alternatively, the map may be a three-dimensional map that shows the correlation among a coolant temperature Tw, an intake air temperature Ti and an initial ignition timing, and the ignition timing determining unit 256 may determine the initial ignition timing at the time of starting the engine 10 on the basis of the selected map, the coolant temperature Tw and the intake air temperature Ti.

The ignition timing determining unit 256 selects map A when the start of the engine 10 is an initial start, the EV priority mode is selected and the start of the engine 10 is an autonomous start. Note that the ignition timing determining unit 256 may, for example, select map A when the initial start determination flag, the select flag and the autonomous start determination flag each are in an on status.

The ignition timing determining unit 256 selects map B when the start of the engine 10 is an initial start, the HV priority mode is selected and the start of the engine 10 is an autonomous start. Note that the ignition timing determining unit 256 may, for example, select map B when the initial start determination flag and the autonomous start determination flag are in an on status and the select flag is in an off status.

The ignition timing determining unit 256 selects map C irrespective of the state of the selected driving mode when the start of the engine 10 is not an initial start and the start of the engine 10 is an autonomous start. Note that the ignition timing determining unit 256 may, for example, select map C irrespective of the status of the select flag when the initial start determination flag is in an off status and the autonomous start determination flag is in an on status.

The ignition timing determining unit 256 selects map D when the start of the engine 10 is an initial start, the EV priority mode is selected and the start of the engine 10 is a load request start. Note that the ignition timing determining unit 256 may, for example, select map D when the initial start determination flag and the select flag each are in an on status and the autonomous start determination flag is in an off status.

The ignition timing determining unit 256 selects map E when the start of the engine 10 is an initial start, the HV priority mode is selected and the start of the engine 10 is a load request start. Note that the ignition timing determining unit 256 may select map E when the initial start determination flag is in an on status and the select flag and the autonomous start determination flag each are in an off status.

The ignition timing determining unit 256 selects map F irrespective of the state of the selected driving mode when the start of the engine 10 is not an initial start and the start of the engine 10 is a load request start. Note that the ignition timing determining unit 256 may select map F irrespective of the status of the select flag when the initial start determination flag and the autonomous start determination flag each are in an off status.

Figure 4:
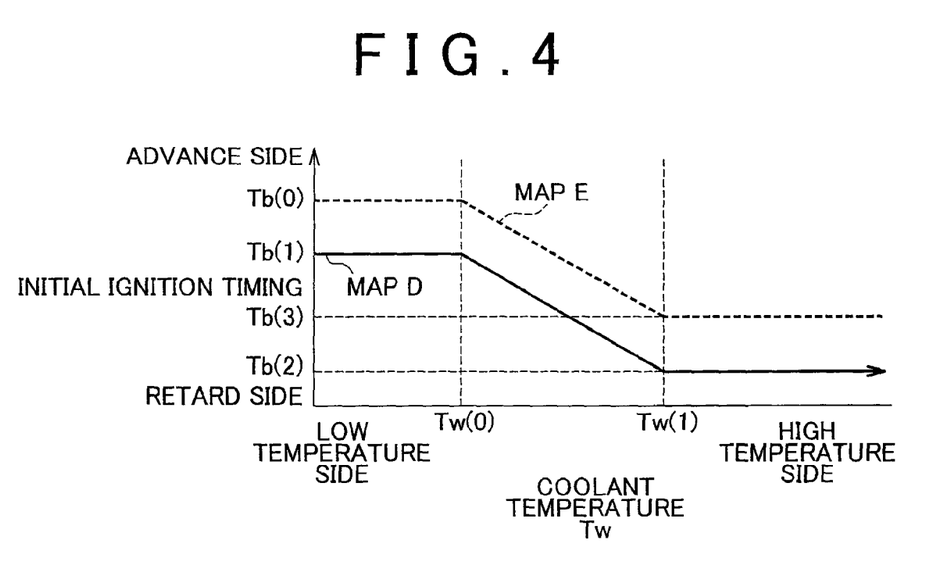
FIG. 4 is a graph (first case) that shows the correlation between the ignition timing of the engine and a coolant temperature.

As shown in FIG. 4, when map D (solid line in FIG. 4) and map E (broken line in FIG. 4) are compared with each other, map D is defined such that the ignition timing is more retarded than the ignition timing in map E with respect to the same coolant temperature Tw. That is, when the engine 10 is started in response to a request for driving force for the first time after a start-up of the system of the vehicle 1, the initial ignition timing determined by map D while the EV priority mode is selected is determined so as to be more retarded than the initial ignition timing determined by map E while the HV priority mode is selected.

In map E, for example, when the coolant temperature Tw is lower than Tw(0), the initial ignition timing is Tb(0). On the other hand, when the coolant temperature Tw is higher than Tw(1), the initial ignition timing is Tb(3) that is more retarded than Tb(0). Furthermore, when the coolant temperature Tw falls between Tw(0) and Tw(1), a value that linearly varies between Tb(0) and Tb(3) with an increase in the coolant temperature Tw is the initial ignition timing.

In map D, for example, when the coolant temperature Tw is lower than Tw(0), the initial ignition timing is Tb(1) that is more retarded than Tb(0). On the other hand, when the coolant temperature Tw is higher than Tw(1), the initial ignition timing is Tb(2) that is more retarded than Tb(1) and Tb(3). Furthermore, when the coolant temperature Tw falls between Tw(0) and Tw(1), a value that linearly varies between Tb(1) and Tb(2) with an increase in the coolant temperature Tw is the initial ignition timing.

In the present embodiment, map D just needs to be at least defined such that the ignition timing is more retarded than that of map E at the same coolant temperature Tw, and is not limited to the correlation such that map D and map E are offset from each other in the ordinate axis direction as shown in FIG. 4. In addition, the ignition timing is a constant value when the coolant temperature Tw is lower than Tw(0) and when the coolant temperature Tw is higher than Tw(1) in map D and map E; instead, the ignition timing may vary linearly or non-linearly with a variation in the coolant temperature Tw in at least any one of when the coolant temperature Tw is lower than Tw(0) and when the coolant temperature Tw is higher than Tw(1). Furthermore, it is also applicable that, in map D and map E, when the coolant temperature Tw falls between Tw(0) and Tw(1), a value that non-linearly varies between Tb(1) and Tb(2) with an increase in the coolant temperature Tw is the initial ignition timing.

Figure 5:
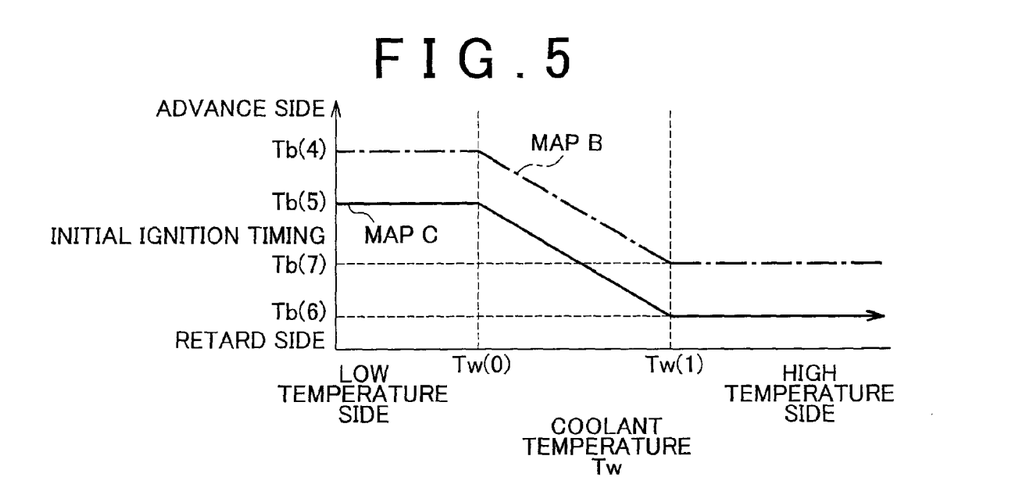
FIG. 5 is a graph (second case) that shows the correlation between the ignition timing of the engine and a coolant temperature.

As shown in FIG. 5, when map B (alternate long and short dash line in FIG. 5) and map C (solid line in FIG. 5) are compared with each other, map C is defined such that the ignition timing is more retarded than the ignition timing in map B with respect to the same coolant temperature Tw. That is, the initial ignition timing at the time of starting the engine 10 for the first time in a period from a start-up of the system of the vehicle 1 to a stop of the system is determined so as to be different from the initial ignition timing at the time of starting the engine 10 for the second time or later (at the time of intermittent starting). Specifically, the initial ignition timing at the time of starting the engine for the second time or later in a period from a start-up of the system of the vehicle 1 to a stop of the system is determined so as to be more retarded than the initial ignition timing at the time of starting the engine 10 for the first time.

Note that the correlation between map B and map C in FIG. 5 differs from the correlation between map D and map E in FIG. 4 in that Tb(0) to Tb(3) are respectively replaced with Tb(4) to Tb(7). Therefore, the detailed description will not be repeated.

In the present embodiment, map C just needs to be at least defined such that the ignition timing is more retarded than that of map B at the same coolant temperature Tw, and is not limited to the correlation such that map B and map C are offset from each other in the ordinate axis direction as shown in FIG. 5.

Note that the correlation between map E and map F is similar to the correlation between map B and map C. That is, map E is defined such that the ignition timing is more retarded than the ignition timing in map F with respect to the same coolant temperature Tw.

Figure 6:
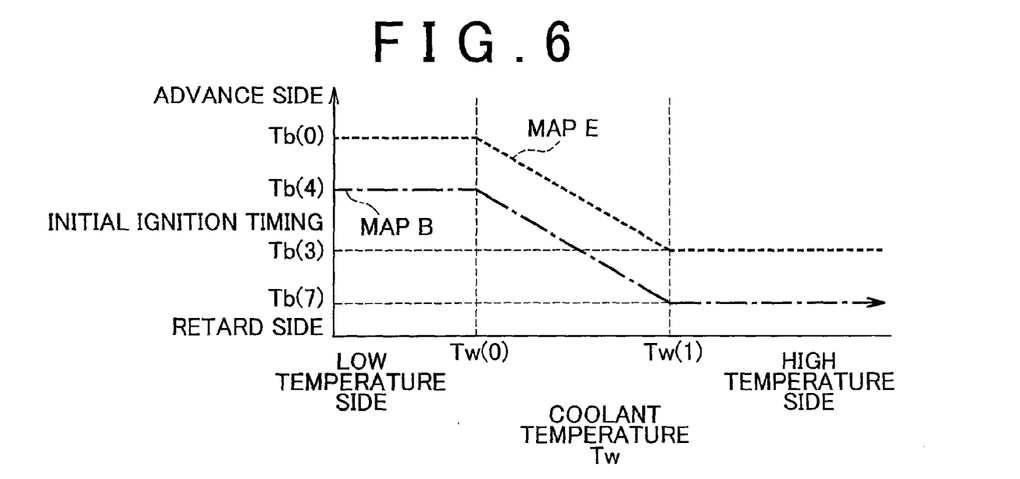
FIG. 6 is a graph (third case) that shows the correlation between the ignition timing of the engine and a coolant temperature.

As shown in FIG. 6, when map B (alternate long and short dash line in FIG. 6) and map E (broken line in FIG. 6) are compared with each other, map B is defined such that the ignition timing is more retarded than the ignition timing in map E with respect to the same coolant temperature Tw. That is, the initial ignition timing at the time of starting the engine 10 in response to a request for driving force (at the time of a load request start) is determined so as to be different from the initial ignition timing at the time of starting the engine 10 in response to a request for other than driving force (at the time of an autonomous start). Specifically, while the HV priority mode is selected, the initial ignition timing at the time of starting the engine 10 in response to a request for other than driving force is determined so as to be more retarded than the ignition timing at the time of starting the engine 10 in response to a request for driving force.

Note that the correlation between map B and map E in FIG. 6 differs from the correlation between map D and map E in FIG. 4 in that map D is replaced with map B. Therefore, the detailed description thereof will not be repeated.

In the present embodiment, map B just needs to be at least defined such that the ignition timing is more retarded than that of map E at the same coolant temperature Tw, and is not limited to the correlation such that map B and map E are offset from each other in the ordinate axis direction as shown in FIG. 6.

Note that, even while the EV priority mode is selected, the initial ignition timing at the time of starting the engine 10 in response to a request for driving force (at the time of a load request start) may be determined so as to be different from the initial ignition timing at the time of starting the engine 10 in response to a request for other than driving force (at the time of an autonomous start). For example, map A may be at least defined such that the ignition timing is more retarded than that of map E at the same coolant temperature Tw.

In addition, in the present embodiment, map A is at least defined such that the ignition timing is more retarded than that of map E at the same coolant temperature Tw. That is, the initial ignition timing at the time of an autonomous start while the EV priority mode is selected is defined so as to be more retarded than the initial ignition timing at the time of a load request start while the HV priority mode is selected.

Maps A, B, D and E used at the time of an initial start are at least defined in terms of improvement in startability and emissions of exhaust gas. In addition, maps C and F used at the time of a start for the second time or later (at the time of an intermittent start) are defined in terms of suppressing a shock and knocking at the time of starting in addition to improvement in startability and emissions of exhaust gas. In addition, in each of maps A to E, the initial ignition timing is defined so as to be more retarded when the coolant temperature Tw is high than when the coolant temperature Tw is low.

Note that, after the engine 10 has been started, the ignition timing determining unit 256 may correct the ignition timing on the basis of the state of the engine 10. The state that the engine 10 has been started means a state where fuel is injected into each cylinder and the rotation speed of the engine 10 is higher than or equal to a predetermined rotation speed at which the engine 10 is able to autonomously rotate. The state of the engine 10, for example, means a state where knocking is occurring, a state where driving force is required or an exhaust gas recirculation amount (EGR amount).

When the engine 10 is started, the start control unit 258 uses the first MG 20 to crank the engine 10 so as to rotate at or above a predetermined rotation speed at which initial combustion is possible. When the rotation speed of the engine 10 becomes higher than or equal to the rotation speed, at which initial combustion is possible, through cranking, the start control unit 25 executes ignition control at the ignition timing determined by the ignition timing determining unit 256 together with fuel injection control to thereby start the engine 10. The start control unit 258 generates the control signal S1 and transmits the control signal S1 to the engine 10.

In the present embodiment, the initial start determining unit 250, the mode determining unit 252, the autonomous start determining unit 254, the ignition timing determining unit 256 and the start control unit 258 each are implemented by the CPU of the ECU 200 executing programs stored in the memory, and function as software; instead, these units may be implemented by hardware. Note that such programs are recorded in a storage medium and the storage medium is mounted on the vehicle.

Figure 7:
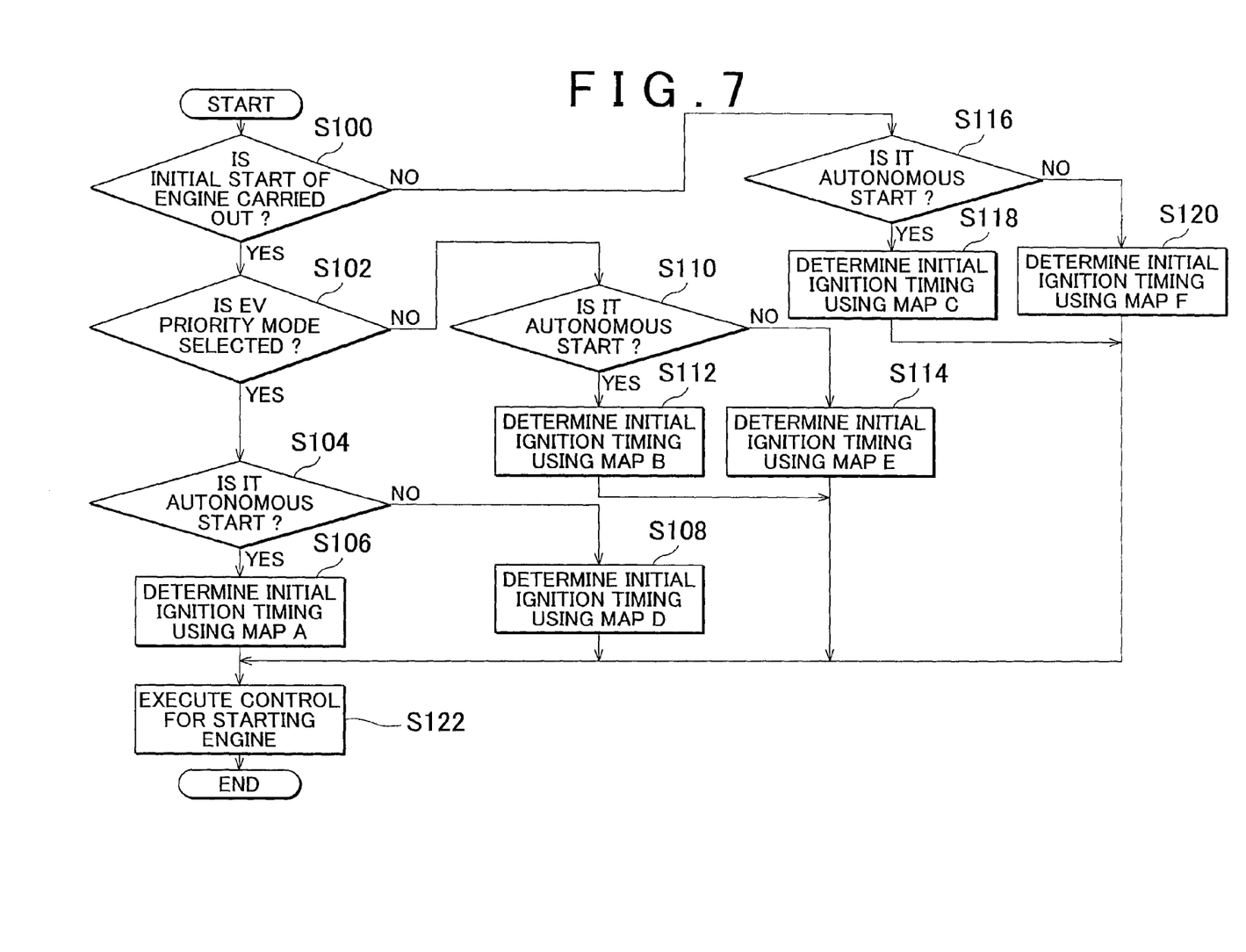
FIG. 7 is a flow chart that shows the control structure of a program executed by the ECU equipped for the vehicle according to the embodiment.

The control structure of a program executed by the ECU 200 equipped for the vehicle 1 according to the present embodiment will be described with reference to FIG. 7.

In step (hereinafter, step is abbreviated as S) 100, the ECU 200 determines whether an initial start of the engine 10 is carried out. When the ECU 200 carries out an initial start of the engine 10 (YES in S100), the process proceeds to S102. When this is not the case (NO in S100), the process proceeds to S116.

In S102, the ECU 200 determines whether the EV priority mode is selected. When the EV priority mode is selected (YES in S102), the process proceeds to S104. When this is not the case (NO in S102), the process proceeds to S110.

In S104, the ECU 200 determines whether the start of the engine 10 is an autonomous start. When the start of the engine 10 is an autonomous start (YES in S104), the process proceeds to S106. When this is not the case (NO in S104), the process proceeds to S108.

In S106, the ECU 200 uses map A to determine the initial ignition timing. That is, the ECU 200 determines the initial ignition timing on the basis of the coolant temperature Tw and map A. In S108, the ECU 200 uses map D to determine the initial ignition timing.

In S110, the ECU 200 determines whether the start of the engine 10 is an autonomous start. When the start of the engine 10 is an autonomous start (YES in S110), the process proceeds to S112. When this is not the case (NO in S110), the process proceeds to S114.

In S112, the ECU 200 uses map B to determine the initial ignition timing. In S114, the ECU 200 uses map E to determine the initial ignition timing. In S116, the ECU 200 determines whether the start of the engine 10 is an autonomous start. When the start of the engine 10 is an autonomous start (YES in S116), the process proceeds to S118. When this is not the case (NO in S116), the process proceeds to S120.

In S118, the ECU 200 uses map C to determine the initial ignition timing. In S120 the ECU 200 uses map F to determine the initial ignition timing. In S122, the ECU 200 uses the determined initial ignition timing to execute control for starting the engine 10.

The operation of the ECU 200 equipped for the vehicle 1 according to the present embodiment based on the above described structure and flow chart will be described.

(Case: EV Priority Mode is Selected)

For example, it is assumed that the external power supply 302 is used to charge the main battery 70 to a full-charge state and then the vehicle 1 is driven while the EV priority mode is selected. At this time, the EV priority mode is selected and the SOC of the main battery 70 is higher than or equal to the threshold SOC(0), so the vehicle 1 runs using the second MG 30 in a state where the engine 10 is stopped.

When the driver depresses the accelerator pedal in order to accelerate the vehicle 1, the initial start of the engine 10 is carried out in order to generate driving force using the engine 10 (YES in S100). The EV priority mode is selected (YES in S102) and the start of the engine 10 is a load request start (NO in S104), so the initial ignition timing at the time of starting the engine 10 is determined on the basis of the coolant temperature Tw of the engine 10 and map D (S108). The ECU 200 executes control for starting the engine 10 on the basis of the determined initial ignition timing (S122).

After the engine 10 is started, when the driving force of the engine 10 is not required by, for example, releasing the depression of the accelerator pedal, the engine 10 is stopped. After that, when the accelerator pedal is depressed again and the driving force of the engine 10 is required, the second start of the engine 10 is carried out (NO in S100). At this time, the start of the engine 10 is a load request start (NO in S116), so the initial ignition timing at the time of starting the engine 10 is determined on the basis of the coolant temperature Tw of the engine 10 and map F (S120). The ECU 200 executes control for starting the engine 10 on the basis of the determined initial ignition timing (S122).

Note that, when the second start of the engine 10 is, for example, an autonomous start in the case where the SOC of the main battery 70 is lower than the threshold SOC(0) (YES in S116), the initial ignition timing at the time of starting the engine 10 is determined on the basis of the coolant temperature Tw of the engine 10 and map C (S118).

In addition, the initial start of the engine 10 while the EV priority mode is selected is, for example, an autonomous start in the case where the SOC of the main battery 70 is lower than the threshold SOC(0) (YES in S104), the initial ignition timing at the time of starting the engine 10 is determined on the basis of the coolant temperature Tw of the engine 10 and map A (S106).

(Case: HV Priority Mode is Selected)

For example, it is assumed that the external power supply 302 is used to charge the main battery 70 to a full-charge state and then the vehicle 1 is driven while the EV priority mode is selected. When the vehicle 1 runs using the second MG 30 in a state where the engine 10 is stopped, in the case where the driver operates to change from the EV priority mode to the HV priority mode and the driver depresses the accelerator pedal in order to accelerate the vehicle 1, the initial start of the engine 10 is carried out (YES in S100). The HV priority mode is selected (NO in S102) and the start of the engine 10 is a load request start (NO in S110), so the initial ignition timing at the time of starting the engine 10 is determined on the basis of the coolant temperature Tw of the engine 10 and map E (S114). The ECU 200 executes control for starting the engine 10 on the basis of the determined initial ignition timing (S122) to thereby start the engine 10.

Note that, when the start of the engine 10 is, for example, an autonomous start in the case where the SOC is lower than the threshold SOC(0) (YES in S110), the initial ignition timing at the time of starting the engine 10 is determined on the basis of the coolant temperature Tw of the engine 10 and map B (S112).

In the vehicle 1 that is chargeable using the external power supply 302 according to the present embodiment, when the vehicle 1 is charged using the external power supply 302 and then the EV priority mode is selected at the time when the vehicle 1 is started to move, it is necessary to generate output power immediately after the start of the engine 10 in the case where the engine 10 is started in response to a driver's request for acceleration. Particularly, while the EV priority mode is selected, a standing time immediately before the start of the engine 10 is longer than that of the HV priority mode. Therefore, the initial ignition timing determined on the basis of map D that is selected when the EV priority mode is selected and the engine 10 is started in response to a request for load is set so as to be later than the initial ignition timing determined on the basis of map E that is selected when the HV priority mode is selected and the engine 10 is started in response to a request for load. By so doing, it is possible to improve startability of the engine 10 and improve emissions of exhaust gas. Thus, it is possible to provide the vehicle and vehicle control method that determine the appropriate ignition timing at the time of starting the internal combustion engine equipped for the hybrid vehicle.

Figure 1:
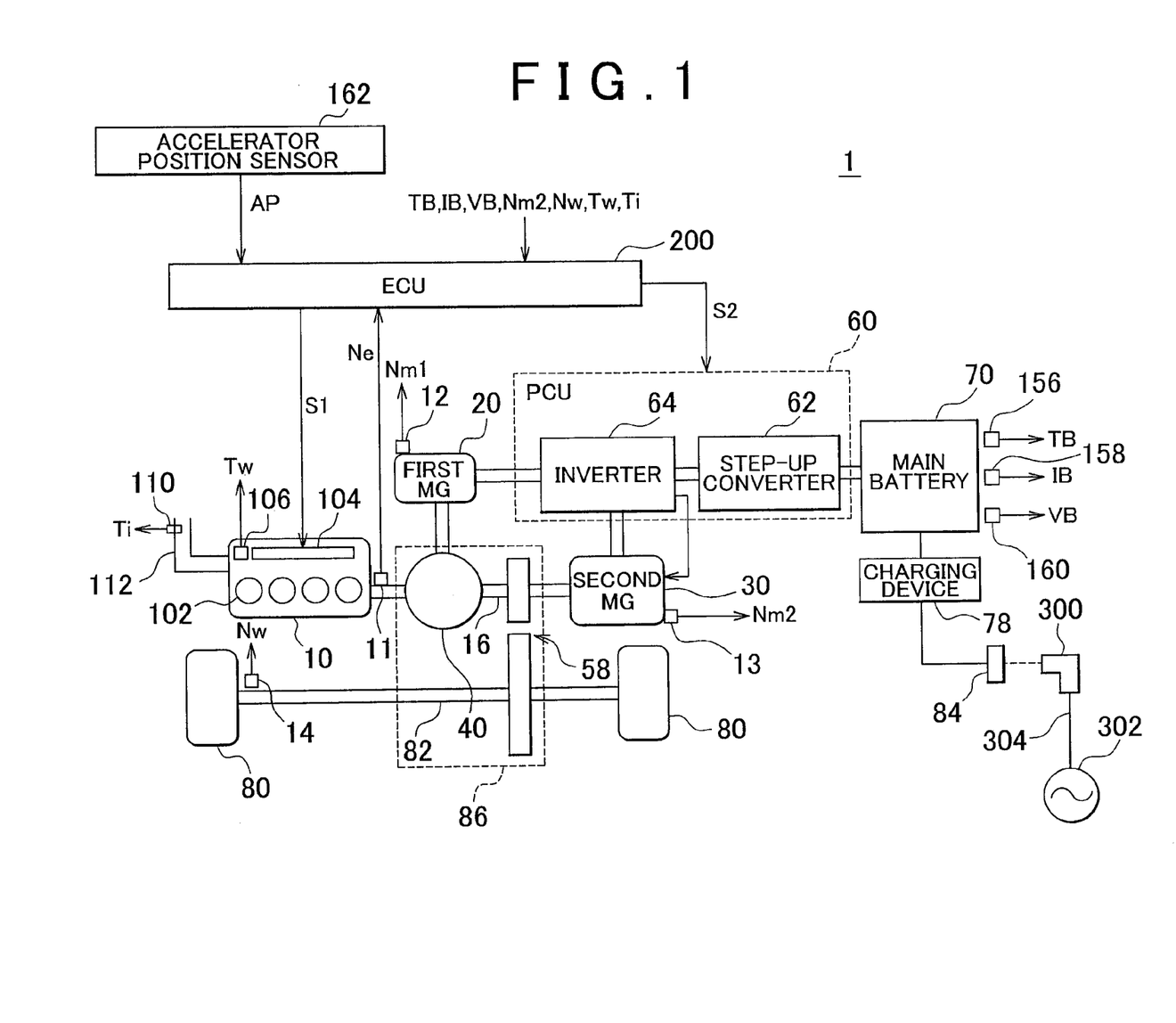
FIG. 1 is an overall block diagram of a vehicle according to an embodiment.

Note that FIG. 1 shows the vehicle 1 of which the drive wheels 80 are front wheels as an example; however, the aspect of the invention is not specifically limited to such a drive system. For example, the vehicle 1 may be configured such that rear wheels are used as drive wheels. Alternatively, the vehicle 1 may be configured such that the second MG 30 shown in FIG. 1 is coupled to a driving shaft for driving the rear wheels instead of the driving shaft 16 for the front wheels. In addition, a shift mechanism may be provided between the driving shaft 16 and the reduction gear 58 or between the driving shaft 16 and the second MG 30. Alternatively, the vehicle 1 may be configured such that the first MG 20 is directly coupled to the output shaft of the engine 10, the second MG 30 is omitted and a shift mechanism having a clutch is provided instead of the power split device 40.

In addition, in the present embodiment, the initial ignition timing in the case where the EV priority mode is selected at the time of the initial start of the engine 10 in response to a request for load is more retarded than the initial ignition timing in the case where the HV priority mode is selected at the time of the initial start of the engine 10 in response to a request for load; instead, for example, the initial ignition timing in the case where the EV priority mode is selected at the time of the second or later start of the engine 10 in response to a request for load may be more retarded than the initial ignition timing in the case where the HV priority mode is selected.

The embodiment described above should be regarded as only illustrative in every respect and not restrictive. The scope of the invention is defined by the appended claims rather than the above description. The scope of the invention is intended to encompass all modifications within the meaning and scope of the appended claims and equivalents thereof.

What is claimed is:

1. A vehicle comprising:
   an internal combustion engine;
   a rotary electric machine that generates driving force for the vehicle; and
   a control unit that controls the internal combustion engine on the basis of a state of the vehicle, wherein
   when the internal combustion engine is started in response to a request for the driving force, the control unit is programmed to control the internal combustion engine such that ignition timing of the internal combustion engine while a first mode is selected is later than the ignition timing while a second mode is selected, and the ignition timing of the internal combustion engine at a first engine temperature while one of the first mode and the second mode is selected differs from the ignition timing of the internal combustion engine at a second temperature while the one of the first mode and the second mode is selected, and the vehicle is more likely to be driven using the rotary electric machine in a state where the internal combustion engine is stopped in the first mode than in the second mode.

2. The vehicle according to claim 1, wherein
when the internal combustion engine is started in response to a request for the driving force for the first time after a system of the vehicle starts up, the control unit controls the internal combustion engine such that the ignition timing while the first mode is selected is later than the ignition timing while the second mode is selected.

3. The vehicle according to claim 2, wherein
the control unit controls the internal combustion engine such that the ignition timing at the time of starting the internal combustion engine for the first time in a period from the start-up of the system to a stop of the system is different from the ignition timing at the time of starting the internal combustion engine for the second time or later.

4. The vehicle according to claim 3, wherein
the control unit controls the internal combustion engine such that the ignition timing at the time of starting the internal combustion engine for the second time or later in a period from the start-up of the system to the stop of the system is later than the ignition timing at the time of starting the internal combustion engine for the first time.

5. The vehicle according to claim 1, wherein
the control unit controls the internal combustion engine such that the ignition timing at the time of starting the internal combustion engine in response to a request for the driving force is different from the ignition timing at the time of starting the internal combustion engine in response to a request for other than the driving force.

6. The vehicle according to claim 5, wherein
while the second mode is selected, the control unit controls the internal combustion engine such that the ignition timing at the time of starting the internal combustion engine in response to a request for other than the driving force is later than the ignition timing at the time of starting the internal combustion engine in response to a request for the driving force.

7. The vehicle according to claim 1, further comprising:
an electrical storage device that supplies electric power to the rotary electric machine, wherein
while the first mode is selected, the control unit controls the internal combustion engine such that the internal combustion engine is started when a state of charge of the electrical storage device is lower than a first threshold, and
while the second mode is selected, the control unit controls the vehicle such that the state of charge is kept higher than a second threshold.

8. The vehicle according to claim 7, wherein
the state of the vehicle includes the state of charge of the electrical storage device.

9. The vehicle according to claim 1, wherein
the state of the vehicle includes a speed of the vehicle.

10. The vehicle according to claim 1, wherein
the rotary electric machine is a first rotary electric machine that rotates a driving shaft of the vehicle to drive the vehicle, the vehicle further comprising:
a second rotary electric machine; and
a power transmission device that mechanically couples three elements, that is, the driving shaft, an output shaft of the internal combustion engine and a rotary shaft of the second rotary electric machine, and that sets any one of the three elements as a reaction element to enable transmission of power between the other two elements.

11. A vehicle control method used in a vehicle equipped with an internal combustion engine, a rotary electric machine that generates driving force for the vehicle and an electrical storage device that supplies electric power to the rotary electric machine, comprising:
detecting a request for the driving force; and
controlling the internal combustion engine with a control unit such that, when the internal combustion engine is started in response to a request for the driving force, the control unit is programmed to control the internal combustion engine such that ignition timing of the internal combustion engine while a first mode is selected is later than the ignition timing while a second mode is selected, and the timing of the internal combustion engine at a first engine temperature while one of the first mode and the second mode is selected differs from the timing of the internal combustion engine at a second temperature while the one of the first mode and the second mode is selected, wherein
the vehicle is more likely to be driven using the rotary electric machine in a state where the internal combustion engine is stopped in the first mode than in the second mode.

12. The vehicle control method according to claim 11, wherein
when the internal combustion engine is started in response to a request for the driving force for the first time after a system of the vehicle starts up, the internal combustion engine is controlled such that the ignition timing while the first mode is selected is later than the ignition timing while the second mode is selected.

13. The vehicle control method according to claim 12, wherein
the internal combustion engine is controlled such that the ignition timing at the time of starting the internal combustion engine for the first time in a period from the start-up of the system to a stop of the system is different from the ignition timing at the time of starting the internal combustion engine for the second time or later.

14. The vehicle control method according to claim 13, wherein
the internal combustion engine is controlled such that the ignition timing at the time of starting the internal combustion engine for the second time or later in a period from the start-up of the system to the stop of the system is later than the ignition timing at the time of starting the internal combustion engine for the first time.

15. The vehicle control method according to claim 11, wherein
the internal combustion engine is controlled such that the ignition timing at the time of starting the internal combustion engine in response to a request for the driving force is different from the ignition timing at the time of starting the internal combustion engine in response to a request for other than the driving force.

16. The vehicle control method according to claim 15, wherein while the second mode is selected, the internal combustion engine is controlled such that the ignition timing at the time of starting the internal combustion engine in response to a request for other than the driving force is later than the ignition timing at the time of starting the internal combustion engine in response to a request for the driving force.

17. The vehicle control method according to claim 11, wherein while the first mode is selected, the internal combustion engine is controlled such that the internal combustion engine is started when a state of charge of the electrical storage device is lower than a first threshold, and while the second mode is selected, the vehicle is controlled such that the state of charge is kept higher than a second threshold.

\* \* \* \* \*